(12) United States Patent
Mondragon-Parra et al.

(10) Patent No.: US 7,717,793 B2
(45) Date of Patent: May 18, 2010

(54) FIXED-CENTER CONSTANT VELOCITY JOINT

(75) Inventors: Eduardo Mondragon-Parra, Saginaw, MI (US); Keith A. Kozlowski, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 355 days.

(21) Appl. No.: 11/827,127

(22) Filed: Jul. 10, 2007

(65) Prior Publication Data

US 2009/0017922 A1   Jan. 15, 2009

(51) Int. Cl.
F16D 3/223   (2006.01)
(52) U.S. Cl. ........................ 464/144; 464/906
(58) Field of Classification Search ................ 464/140, 464/144–146, 906
See application file for complete search history.

(56) References Cited

U.S. PATENT DOCUMENTS

| | | | | |
|---|---|---|---|---|
| 1,916,442 A | * | 7/1933 | Rzeppa | 464/145 |
| 2,322,570 A | * | 6/1943 | Dodge | 464/144 |
| 3,447,341 A | * | 6/1969 | Miller, Jr. | 464/144 |
| 4,116,020 A | | 9/1978 | Aucktor et al. | |
| 4,678,453 A | | 7/1987 | Aucktor et al. | |
| 5,122,096 A | | 6/1992 | Aucktor et al. | |
| 5,685,777 A | | 11/1997 | Schwarzler | |
| 6,071,195 A | * | 6/2000 | Krude | 464/144 |
| 2004/0005931 A1 | * | 1/2004 | Wang et al. | 464/145 |
| 2005/0124422 A1 | * | 6/2005 | Mondragon-Parra et al. | 464/144 |

FOREIGN PATENT DOCUMENTS

DE   3818730 C1   7/1989

* cited by examiner

Primary Examiner—Greg Binda
(74) Attorney, Agent, or Firm—Cantor Colburn LLP

(57) ABSTRACT

A fixed-center constant velocity joint has a race located concentrically to a rotational first axis, and a ring-shaped cage located concentrically to a rotational second axis. Both the race and the cage are centered to a common center point lying on the first and second axes regardless of the angular state of the joint. A spherical surface carried by the race radially opposes a spherical face carried by the cage for angular movement with respect to the center point. The surface and face are in close or contacting relationship to prevent telescoping movement with respect to the first and second axes.

12 Claims, 6 Drawing Sheets

FIXED-CENTER CONSTANT VELOCITY JOINT

TECHNICAL FIELD

The present invention relates to a ball-type constant velocity joint, and more specifically to a fixed-center constant velocity joint kinematically defined by longitudinal grooves and helical grooves for guiding movement of balls.

BACKGROUND OF THE INVENTION

Known ball-type constant velocity joints are typically of a stroking variety and facilitate rotational movement between a driving shaft and a driven shaft. The ball-type joint is especially useful in applications wherein the driving and driven shafts are angled with respect to one another. Known joints include an inner race attached to one of the shafts and an outer race attached to the other shaft. The inner and outer races define grooves or channels which cooperate to form passages. Roller balls are positioned in the passages and torque is transmitted between the shafts with the roller balls.

Known ball-type joints may include six-balls or eight-balls. Generally, six-ball joints provide greater stroke and angle capabilities than eight-ball joints. On the other hand, eight-ball joints generally can be more compact than six-ball joints. It is desirable to develop a ball-type joint having the advantage of compactness provided by eight-ball joints with the angle capabilities of six-ball joints, while at the same time improving NVH (Noise Vibration and Harshness) characteristics and mechanical efficiency. Yet further, it would be desirable to develop a self-retained and fixed-center joint (i.e. non-stroking) wherein at least a portion of the joint has the ability to hold itself together prior to full assembly in any environmental application, and when operating, a joint that prevents stroking or telescoping movement.

SUMMARY OF THE INVENTION

A fixed-center constant velocity joint has a race located concentrically to a rotational first axis, and a ring-shaped cage located concentrically to a rotational second axis. Both the race and the cage are centered to a common center point lying on the first and second axis regardless of the angular state of the joint. A spherical surface carried by the race radially opposes a spherical face carried by the cage for angular movement with respect to the center point. The surface and face are in close or contacting relationship to prevent telescoping movement with respect to the first and second axis.

A plurality of grooves in and distributed circumferentially about the race preferably includes longitudinal, clockwise and counter-clockwise grooves that extend substantially axially and communicate laterally and in an radial direction through the spherical surface. A ball is located in each groove and extends through respective windows in the cage. Preferably, the windows associated with the clockwise and counter-clockwise grooves extend circumferentially further than the windows associated with the longitudinal grooves. The spherical face of the cage is one of a convex and concave profile and the spherical surface is the other of the convex and concave profiles.

Preferably, the race that is fixed-center to the cage is an inner race with the spherical surface being an outer surface having a convex profile. The grooves cooperate with corresponding channels in an outer race such that the helical channels of the outer race cooperate with the helical grooves of the inner race to form cross groove passages. That is, clockwise grooves are associated with counter-clockwise channels and vice-versa. The ring-shaped cage is located radially between the inner and outer races.

Objects, features and advantages of the present invention include a ball-type constant velocity joint that is compact in design while having large angles of magnitude, telescoping capability and is fixed-center preventing telescoping movement. Other advantages include a robust, light weight, design requiring little or no maintenance and in service has a long and useful life.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
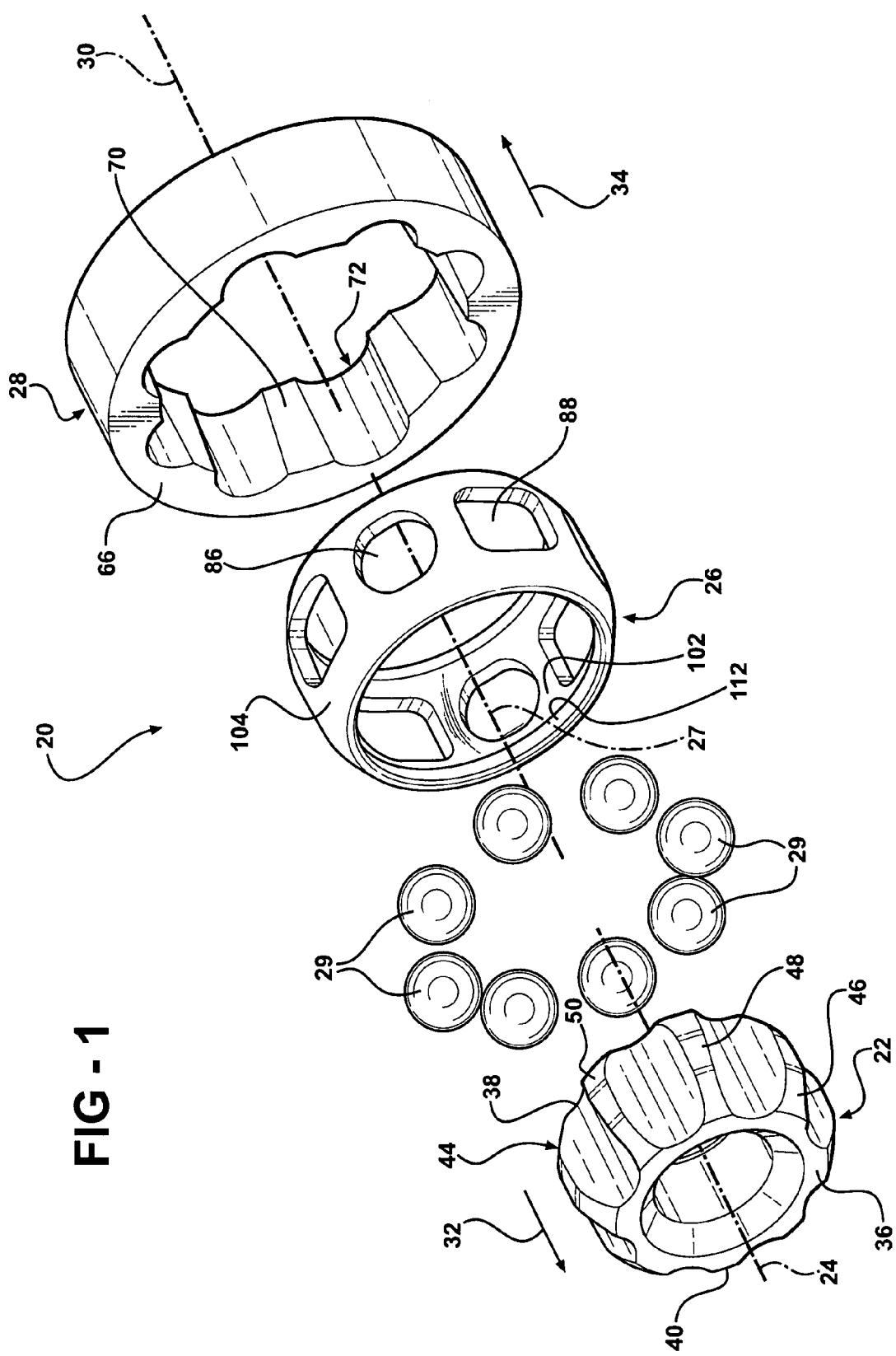
FIG. 1 is an exploded perspective view of a fixed-center constant velocity joint embodying the present invention.
Figure 2:
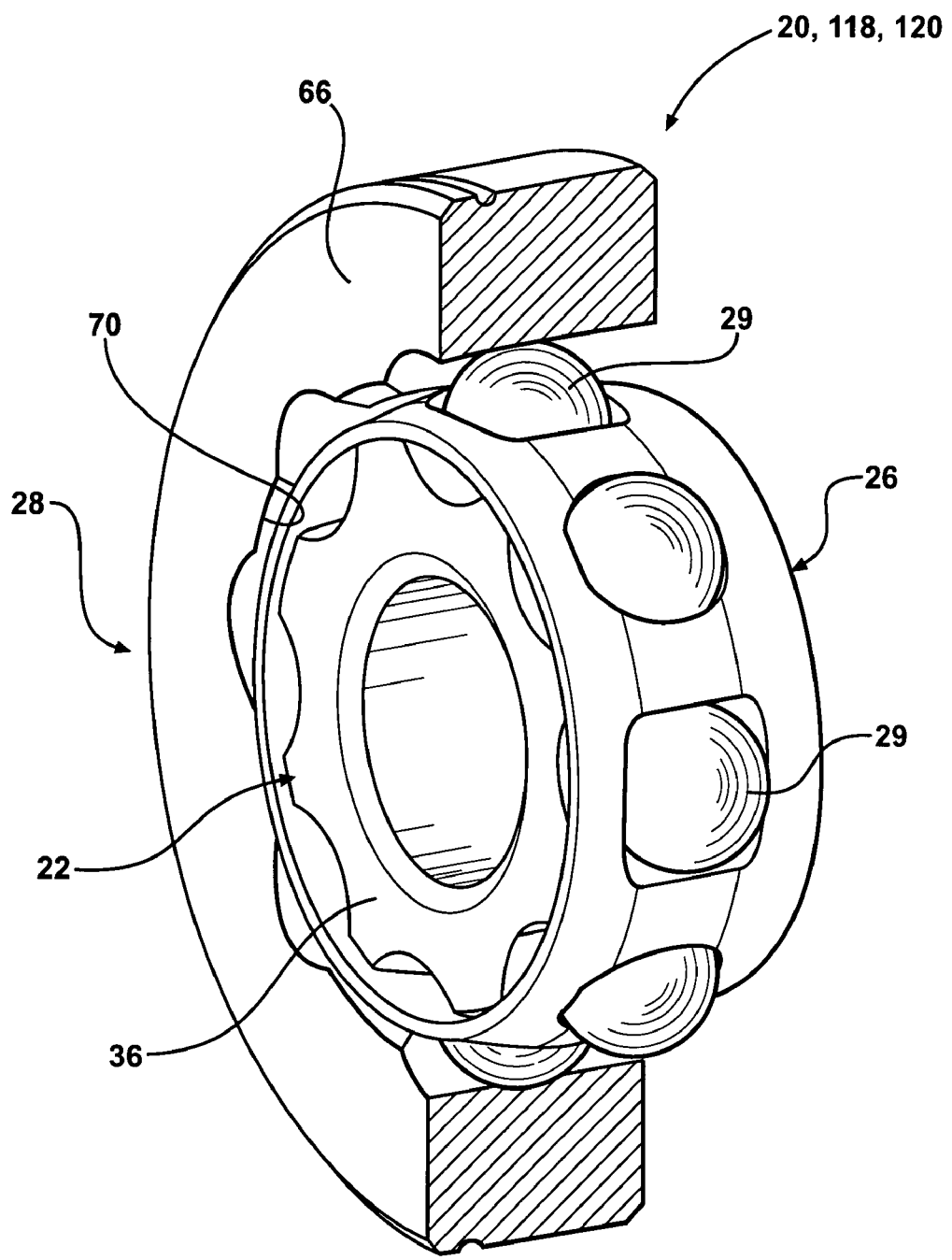
FIG. 2 is a perspective view of the fixed-center constant velocity joint with an outer race segmented to show internal detail.
Figure 3:
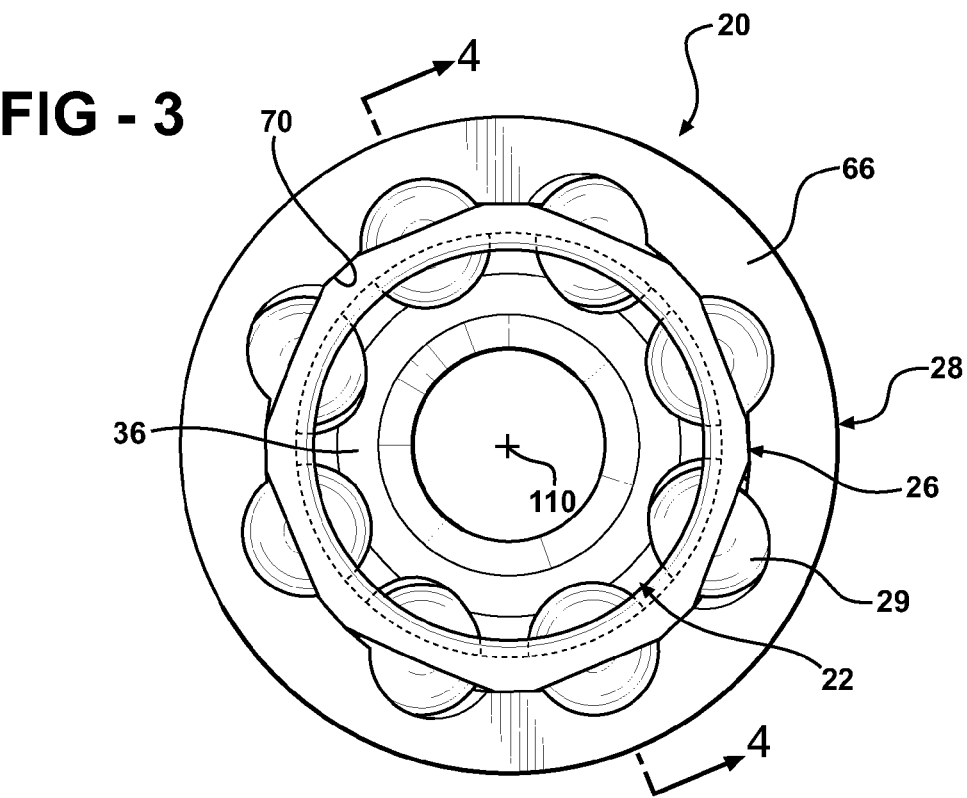
FIG. 3 is a front view of the fixed-center constant velocity joint.

As illustrated in FIGS. 1-3 and 5, the present invention is a self-retained and fixed-center constant velocity joint 20 preferably of a ball-type. The joint 20 has an inner race 22 connected rigidly and disposed concentrically to an end of a first shaft (not shown) that rotates about a first axis 24. The inner race 22 is generally surrounded circumferentially by a cage 26 that rotates about a second axis 27, and the cage 26 is surrounded circumferentially by an outer race 28. The outer race 28 is connected rigidly to a second shaft (not shown) that rotates about a third axis 30. Preferably, eight balls 29 are located radially between the inner and outer races 22, 28 and spaced circumferentially from one another with respect to axes 24, 30.

For the sake of explanation and with respect to the figures, a forward direction is illustrated by arrow 32 and a rearward direction is illustrated by arrow 34 (as best shown in FIG. 1). Referring to FIGS. 1, 4, 5 and 6, the inner race 22 preferably has an annular forward wall 36 and an opposite annular rearward wall 38 each having a generally circular and radially outward perimeter 40.

A circumferentially extending outward surface 44 of the inner race 22 is generally spherical and spans contiguously from and axially (with respect to axis 24) between the outward perimeters 40 of the forward and rearward walls 36, 38. The spherical outward surface 44 has a forward portion 46, an apex portion 48 and a rearward portion 50 that all extend circumferentially with the apex portion 48 being located axially directly between the forward and rearward portions 46, 50. The forward portion 46 spans axially and contiguously rearward from the forward perimeter 40, and diverges radially outward to the apex portion 48. Similarly, the rearward portion 50 spans axially and contiguously forward from the rearward perimeter 40 of the rearward wall 38, and diverges radially outward to the apex portion 48.

Apex portion 48 may be a continuation of the spherical shape of the outward surface 44 or may be cylindrical in shape. Generally, a cross section of inner race 22 taken through an imaginary plane co-extending with axis 24 illustrates a convex profile of the outward surface 44. That is, the forward and rearward portions 46 have a circular profile with the apex portion 48 continuing the circular profile or in the alternative with the apex portion having a flat or plateau-like profile (i.e. if cylindrical).

Figure 4:
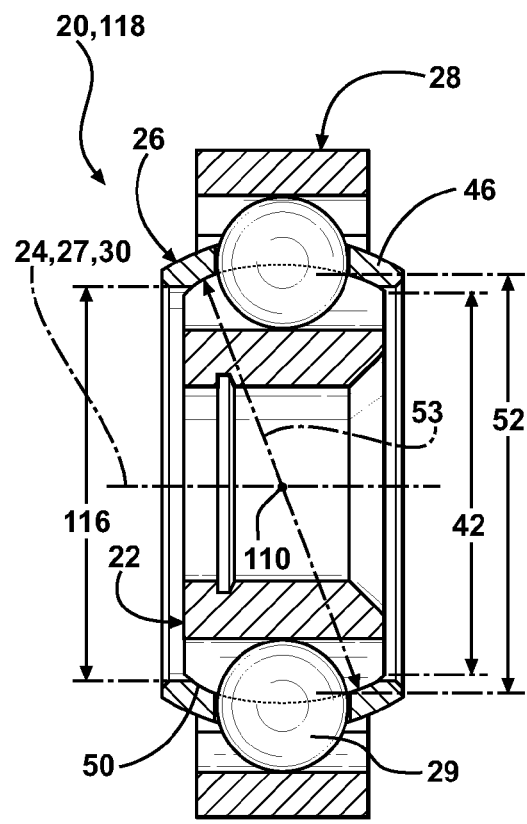
FIG. 4 is a cross section of the fixed-center constant velocity joint taken along line 4-4 of FIG. 3 and illustrated in an axial co-extending state.

For the sake of explanation, relationships between the races 22, 28 and cage 26 are in-part expressed in axial diameters and spherical diameters. An axial diameter is that distance along a line that lies in an imaginary plane orientated perpendicular to a respective rotation axis. A spherical diameter is that distance along a line that extends through a common center point 110 of both the inner race 22 and the cage 26. With this definition, the perimeters 40 of the inner race 22 have axial diameters 42. The generally circular apex portion 48 thus has an axial diameter 52 that is greater than the diameter 42 of the forward and rearward perimeters 40 (as best shown in FIG. 4). If the apex portion 48 is spherical and not cylindrical, the axial diameter 52 is equivalent in distance to a spherical diameter 53 of the forward and rearward portions 46, 50 of the outer surface 44. The axial diameter 42 of the perimeter 40 is the minimum axial diameter of the outward surface 44 and the diameter 52 of the apex portion 48 is the maximum axial diameter of the surface 44.

Figure 6:
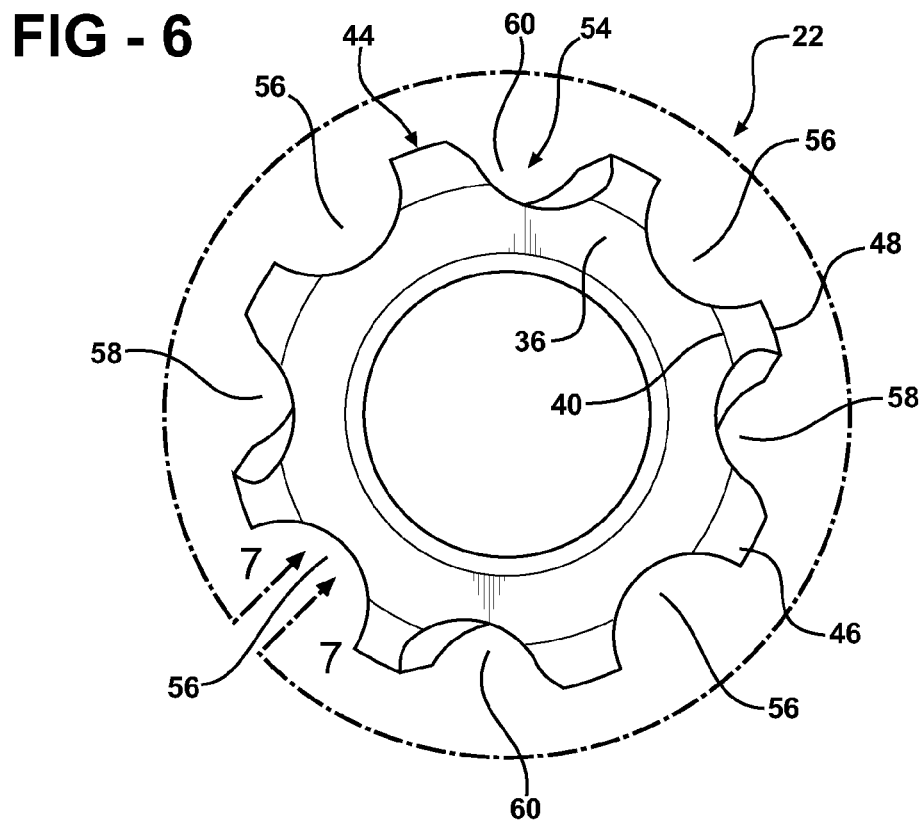
FIG. 6 is a front view of an inner race of the fixed-center constant velocity joint.
Figure 7:
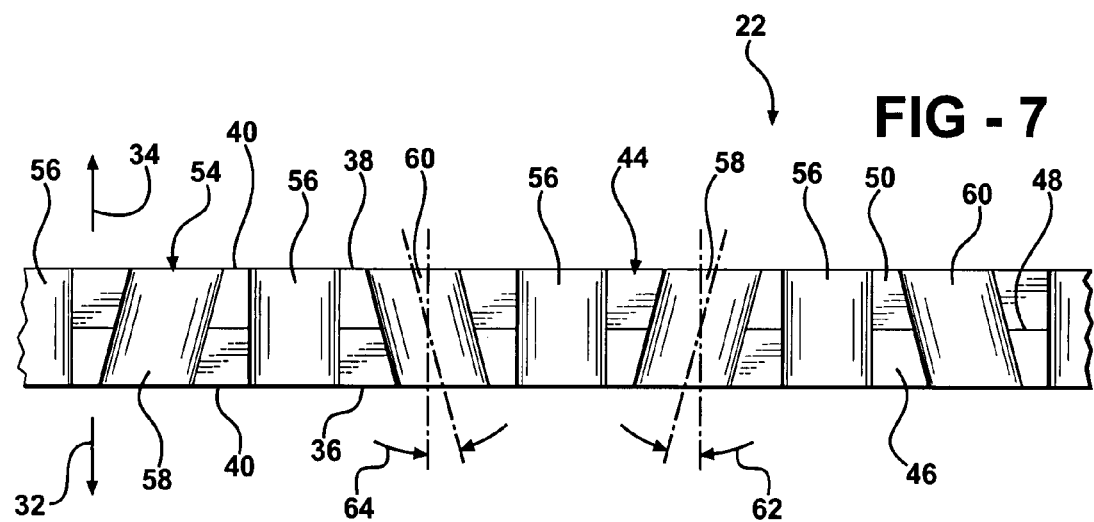
FIG. 7 is a plan view of a spherical outer surface of the inner race viewed along line 7-7 of FIG. 6.

Referring to FIGS. 6 and 7, the inner race 22 preferably has eight or a series of grooves 54 that longitudinally extend axially with respect to axis 24 and communicate radially outward through the outward surface 44. For compact construction of the joint 20, each one of the series of grooves 54 also communicate through the forward and rearward perimeters 40, thus generally making the perimeters circumferentially discontinuous. Each groove of the series of grooves 54 is spaced circumferentially from the next adjacent one of the series of grooves 54. Preferably, the series of grooves 54 have four longitudinal grooves 56 that extend parallel to axis 24, two helical clockwise grooves 58 that slightly spiral or angle in a clockwise direction as the grooves 58 longitudinally extend axially rearward (i.e. rearward direction/arrow 34), and two helical counter-clockwise grooves 60 that slightly spiral or angle in a counter-clockwise direction as the grooves 60 longitudinally extend axially rearward. The spiraling affect of the grooves 58, 60 may not be truly helical in shape, and instead may be simply angled with respect to the longitudinal grooves 58 and as best illustrated in FIG. 7.

Each longitudinal groove 56 is circumferentially adjacent to a clockwise groove 58 on one side and a counter-clockwise groove 60 on the opposite side. Moreover, each helical or angled groove 58, 60 is located circumferentially between two longitudinal grooves 56 of the series of grooves 54. The longitudinal grooves 56 are preferably spaced angularly by about ninety degrees from one another. As best illustrated in FIG. 7, each angled groove 58, 60 is inclined with respect to the adjacent longitudinal grooves 56 by respective positive and negative angles represented by arrows 62, 64. The absolute magnitude of the angles or arrows 62, 64 are about or preferably are equal to one another.

Figure 8:
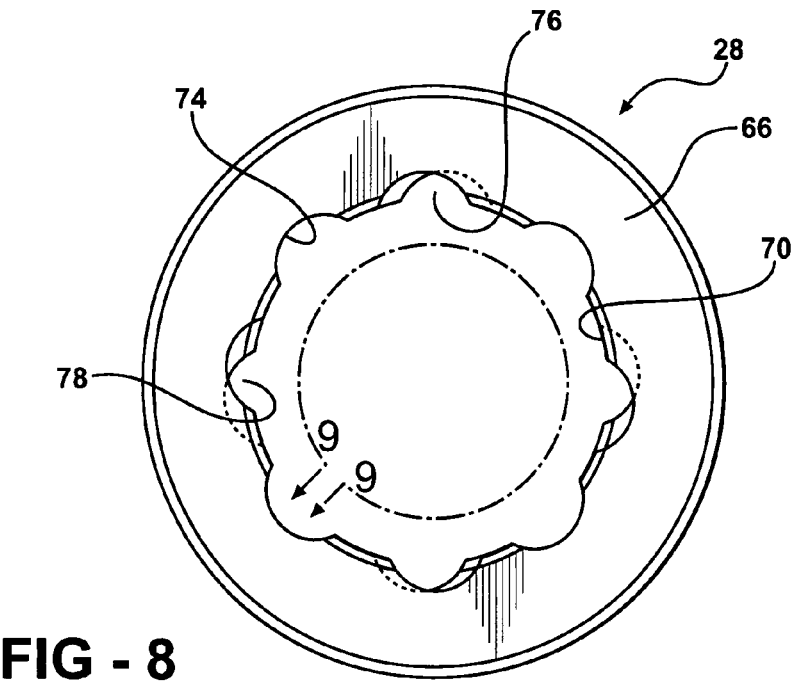
FIG. 8 is a front view of the outer race.
Figure 9:
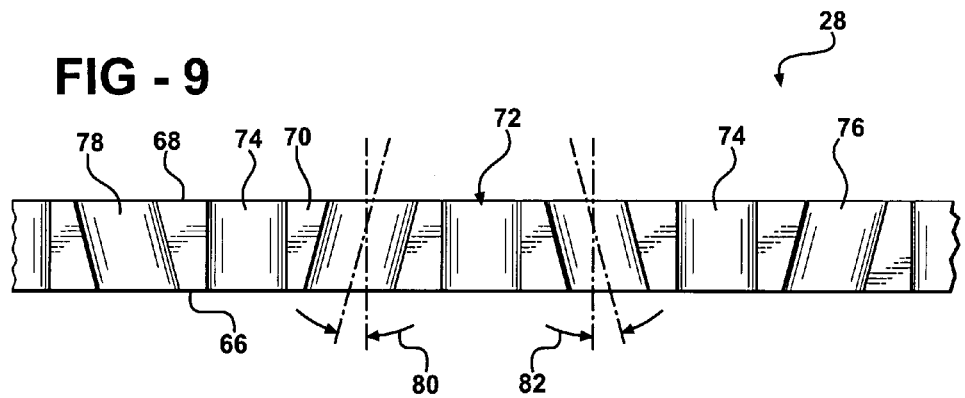
FIG. 9 is a plan view of an inner surface of the outer race viewed along line 9-9 of FIG. 8.

Referring to FIGS. 1 and 8-9, the outer race 28 has an annular forward wall 66 and an opposite annular rearward wall 68, both disposed substantially perpendicular to axis 30. A circumferentially extending inner surface 70 of the outer race 28 spans laterally in an axial direction (with respect to axis 30) between the forward and rearward walls 66, 68. The outer race 28 preferably has eight channels or grooves 72 that longitudinally extend axially with respect to axis 30 and communicate laterally inward (i.e. radially inward with respect to axis 30) through the inner surface 70. Each channel of the series of channels 72 is associated with a respective one of the series of grooves 54, and is thus spaced circumferentially from the next adjacent one of the series of channels 72.

Preferably, the series of channels 72 have four longitudinal channels 74 that extend parallel to axis 30, two helical clockwise channels 76 that slightly spiral or angle in a clockwise direction as the channels 76 longitudinally extend axially rearward (i.e. rearward direction/arrow 34), and two helical counter-clockwise channels 78 that slightly spiral or angle in a counter-clockwise direction as the channels 78 longitudinally extend axially rearward. The spiraling affect of the channels 76, 78 may not be truly helical in shape, and instead may be simply angled with respect to the longitudinal grooves 58 and as best illustrated in FIG. 9.

Each longitudinal channel 74 is circumferentially adjacent to a clockwise channel 76 on one side and a counter-clockwise channel 78 on the opposite side. Moreover, each helical or angled channel 76, 78 is located circumferentially between two longitudinal channels 74 of the series of channels 72. The longitudinal channels 74 are preferably spaced angularly by about ninety degrees from one another. As best illustrated in FIG. 9, each angled channel 76, 78 is inclined with respect to the adjacent longitudinal channels 74 by respective positive and negative angles 80, 82. Preferably, absolute magnitude of the angles 80, 82 are equal to one another and equal to the absolute magnitude of angles 62, 64.

When the joint 20 is assembled, each one of the longitudinal grooves 56 of the inner race 22 is circumferentially aligned to a respective one of the longitudinal channels 74 of the outer race 28, thereby forming a passage for travel of a respective one of the balls 29. Similarly, each one of the clockwise grooves 58 is aligned circumferentially to a respective one of the counter-clockwise channels 78, and each one of the counter-clockwise grooves 60 is aligned circumferentially to a respective one of the clockwise channels 76 all respectively forming passages for travel of respective balls 29.

The inclined or cross groove passages create a constant velocity plane when the joint 20 is angled. The degree of incline of clockwise and counter-clockwise grooves can be smaller than that of a standard 6-ball joint design. The straight or longitudinal passages and cross grooved passages cooperate to allow a greater stroke than a joint that has inclined grooves. In addition, reduction of the helix angle of the helical grooves decreases the contact stresses in the grooves/channels and the forces transmitted to the cage 26 disposed between the inner and outer races 22, 28. Cross groove passages are discussed in greater detail in U.S. Pat. No. 6,468, 164, which is incorporated herein by reference.

Referring to FIGS. 1-5 and 10-12, the cage 26 of the joint 20 preferably has four short windows 86 and four long windows 88. All of the windows 86, 88 are elongated circumferentially with respect to axis 27 and communicate radially through the cage 26. Each one of the short windows 86 is associated with (i.e. adjacent to) a respective one of the longitudinal grooves 56 and each one of the long windows 88 is associated with a respective one of the helical or angled grooves 58, 60 in the inner race 22. Preferably, the width of the short and long windows 86, 88 are about the same, and are slightly greater than the diameter of the balls 29 for minimizing internal friction of the joint 20. One skilled in the art, however, would now know that if the diameter of the ball 29 is greater than the width of the windows 86, 88, the cage 26 may generally lock or trap the balls 29 to the inner race 22. This alternative embodiment, however, would preferably have a frictionless or friction reducing interface between the balls 29 and the cage 26 for smooth operation of the joint 20.

The short windows 86 are defined by a continuous wall 90 having opposing side segments 92 and flanking or opposing end segments 94. The side segments 92 are substantially parallel to one another, extend circumferentially with respect to axis 27, and define the width of the window 86. The opposing end segments 94 preferably have a radius of curvature 95 equal to about half the width of window 86. Similarly, the long windows 88 are defined by a continuous wall 96 having opposing side segments 98 and flanking or opposing end segments 100. The side segments 98 are substantially parallel to one another, extend circumferentially with respect to axis 27, and define the width of the window 88. The opposing end segments 100 preferably have a radius of curvature 101 that even when doubled is substantially less than the width of window 88. Preferably, the width of window 88 is about equal to four time the radius of curvature 101 of the end segments 100. The large radius of curvature of the end segments 94 of continuous wall 90 of short windows 86 provides structural integrity and strength to the cage 26.

Figure 10:
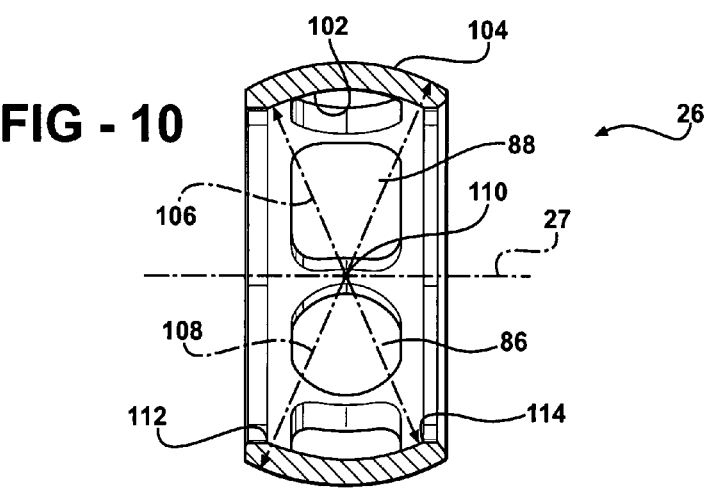
FIG. 10 is a cross section of a cage of the fixed-center constant velocity joint taken along an imaginary plane co-extending with a rotation axis of the cage.
Figure 11:
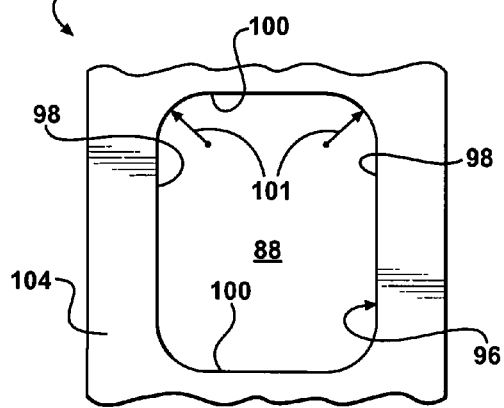
FIG. 11 is a partial side view of the cage illustrating a long window.
Figure 12:
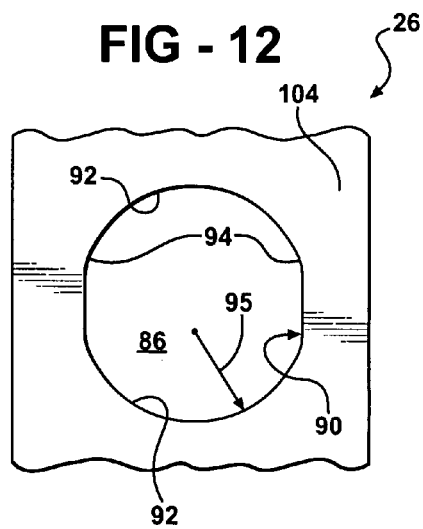
FIG. 12 is a partial side view of the cage illustrating a short window.

The cage 26 is generally ring-shaped having a spherical inner face 102 that extends circumferentially and faces radially inward. An opposite outer face 104 of the cage 26 faces radially outward and is preferably substantially spherical. The continuous walls 90, 96 defining the windows span laterally between and form contiguously into the inner and outer faces 102, 104. The inner and outer faces 102, 104 preferably have respective spherical diameters 106, 108 that both cross through the center point 110, common to both the inner race 22 and the cage 26 (as best shown in FIG. 10). The inner face 102 thus has a concave profile and the outer face 104 has a convex profile when a cross section is taken along an imaginary plane that co-extends with the axis 27.

The inner face 102 of the cage 26 spans laterally (i.e. axially with respect to axis 27) between forward and rearward rims 112, 114 having substantially equal axial diameters 116 (see FIGS. 4 and 5) and the spherical diameter 106 (i.e. extending from rim 112 and through center point 110 to rim 114). To achieve the retaining feature of the joint 20 when the apex portion 48 has the plateau profile (not shown), the axial diameter 116 of the rims 112, 114 is less than the axial diameter 52 of the apex portion 48 of the outer surface 44 of the inner race 22. To prevent telescoping movement of the joint generally along or with respect to axes 24, 27 (i.e. thus self centering the joint), the spherical diameter 53 of the outer surface 44 of the inner race 22 is about equal to or only slightly less than the spherical diameter 106 of the inner face 102 of the cage 26. Preferably, if the spherical diameters 53, 106 are generally equal, the inner race 22 and cage 26 are made of or coated with a friction reducing material.

Figure 5:
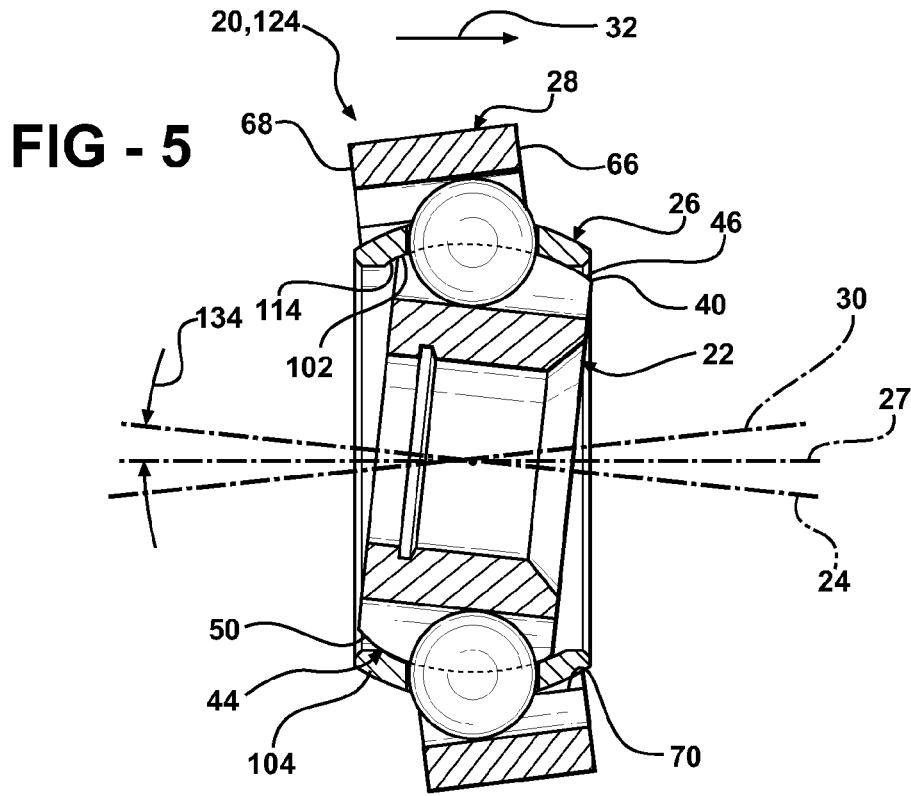
FIG. 5 is a cross section of the fixed-center constant velocity joint similar in perspective to FIG. 4 except illustrated in an angled state.

During operation, the joint 20 moves from a linear state 118, as best shown in FIG. 4, to an angled state 124, as best shown in FIG. 5. When the joint 20 is in the linear state 118, preferably all three axes 24, 27, 30 co-extend to one-another, and thus do not intersect. That is, the inner race 22, the cage 26 and the outer race 28 are substantially concentric to one-another and with respect to the common center point 110. As best shown in FIG. 5, when the joint 20 is in the angled state 124, the axis 24 of the inner race 22 and the axis 27 of the cage 26 and the axis 30 of the outer race 28 will intersect at center point 110. Moreover and when angled, the axis 24 of the inner race 22 is angled with respect to axis 27 of the cage 26 by a negative angular displacement represented by arrow 134 and the axis 30 of the outer race 28 is angled with respect to axis 27 by a positive angular displacement represented by arrow 136. The absolute magnitude of angular displacements 134, 136 are about or preferably equal to one another.

While the forms of the invention herein disclosed constitute presently preferred embodiments, many others are possible. For instance, the outer race 28 may be fixed-center to the cage 26 instead of the inner race 22 and in a similar manner. It is not intended herein to mention all the possible equivalent forms or ramification of the invention. It is understood that terms used herein are merely descriptive, rather than limiting, and that various changes may be made without departing from the spirit or scope of the invention.

What is claimed is:

1. A fixed-center constant velocity joint comprising:
   an inner race for rotation about a first axis and being orientated axially to a center point lying along said first axis;
   an outer race for rotation about a second axis and being orientated axially to said center point that lies along said second axis;
   a cage located radially between said inner and outer races for rotation about a third axis and being orientated axially to said center point that lies along said third axis, said cage having a plurality of long windows and a plurality of short windows located therein;
   a plurality of balls spaced circumferentially about and projecting through said cage, wherein each one of said plurality of balls is constructed and arranged to roll in a respective one of a plurality of grooves in said inner race and a respective one of a plurality of channels in said outer race, said plurality of grooves having a plurality of longitudinal grooves disposed parallel to said first axis and a plurality of angled grooves that are angled with respect to said first axis, said long windows associated with said angled grooves and said short windows associated with said longitudinal grooves; and
   said first, second and third axes co-extending with one-another when the joint is in an linear state, and said first, second and third axes intersecting at said center point when the joint is in an angled state.

2. The fixed-center constant velocity joint set forth in claim 1 further comprising:
   said inner race having a spherical surface extending circumferentially and facing radially outward with respect to said first axis; and
   said cage having a spherical face extending circumferentially and facing radially inward with respect to said third axis.

3. The fixed-center constant velocity joint set forth in claim 2 further comprising:

said spherical surface having a spherical first diameter extending through said center point; and said spherical face having a spherical second diameter extending through said center point and being slightly greater than said first diameter for substantially frictionless movement between said spherical surface and said spherical face while substantially preventing axial telescoping movement between said cage and said inner race.

4. The fixed-center constant velocity joint set forth in claim 3 wherein said plurality of grooves have a plurality of longitudinal grooves disposed parallel to said first axis and a plurality of helical grooves that spiral with respect to said first axis.

5. The fixed-center constant velocity joint set forth in claim 4 wherein each one of the plurality of longitudinal grooves is disposed circumferentially adjacent to a respective one of the plurality of helical grooves.

6. The fixed-center constant velocity joint set forth in claim 5 further comprising:

said plurality of helical grooves having a plurality of clockwise grooves and a plurality of counter-clockwise grooves; and each respective one of said plurality of longitudinal grooves being located circumferentially between a clockwise groove of said plurality of clockwise grooves and a counter-clockwise groove of said plurality of counter-clockwise grooves.

7. The fixed-center constant velocity joint set forth in claim 1 wherein each one of the plurality of longitudinal grooves is disposed circumferentially adjacent to a respective one of said plurality of angled grooves.

8. The fixed-center constant velocity joint set forth in claim 7 further comprising:

said plurality of angled grooves having a plurality of clockwise grooves and a plurality of counter-clockwise grooves; and each respective one of the plurality of longitudinal grooves being located circumferentially between a clockwise groove of said plurality of clockwise grooves and a counter-clockwise groove of said plurality of counter-clockwise grooves.

9. The fixed-center constant velocity joint set forth in claim 1 further comprising:

said outer race having an inner surface facing radially inward with respect to said second axis; and said plurality of channels having a plurality of longitudinal channels disposed parallel to said second axis and with each one of said plurality of longitudinal channels confronting a respective one of said plurality of longitudinal grooves.

10. The fixed-center constant velocity joint set forth in claim 9 further comprising:

said plurality of channels having a plurality of clockwise channels that spiral with respect to said second axis and with each one of said plurality of clockwise channels confronting a respective one of said plurality of counter-clockwise grooves; and said plurality of channels having a plurality of counter-clockwise channels that spiral with respect to said second axis and with each one of said plurality of counter-clockwise channels confronting a respective one of said plurality of clockwise grooves.

11. A fixed-center constant velocity joint comprising:

a race orientated concentrically to a rotational first axis and configured centrally to a center point on said first axis, said race having a spherical surface extending circumferentially and a plurality of grooves longitudinally extending at least partially axially and communicating laterally through said spherical surface in a radial direction with each one of said plurality of grooves being spaced circumferentially from a next adjacent one of said plurality of grooves, said plurality of grooves having a plurality of longitudinal grooves disposed parallel to said first axis and a plurality of angled grooves that are angled with respect to said first axis;

a plurality of balls individually disposed in and movable along said plurality of grooves;

a ring shaped cage orientated concentrically to a rotational second axis and configured centrally to said center point on said second axis, said cage having a spherical face opposing and movable with respect to said spherical surface with said first and second axis co-extending to one another when said joint is in a linear state and said first axis intersecting said second axis at said center point when said joint is in an angled state, said cage having a plurality of long windows and a plurality of short windows located therein, said long windows associated with said angled grooves and said short windows associated with said longitudinal grooves; and a plurality of windows disposed in and spaced circumferentially about said cage with each of one of said plurality of balls extending through a respective one of said plurality of windows.

12. The fixed-center constant velocity joint set forth in claim 11 further comprising:

said race being an inner race located radially inward from said cage;

said spherical surface being an outer surface facing radially outward and having a profile that is convex in configuration;

said spherical face being an inner face facing radially inward and having a profile that is concave in configuration; and a spherical first diameter measured from said center point to said outer surface and a spherical second diameter measured from said center point to said inner face and being slightly greater than said first diameter for allowing angular movement of the joint about said center point while substantially eliminating telescopic movement along said first and second axes.

* * * * *